(12) United States Patent
Khanagha

(10) Patent No.: US 10,403,307 B2
(45) Date of Patent: *Sep. 3, 2019

(54) PITCH DETECTION ALGORITHM BASED ON MULTIBAND PWVT OF TEAGER ENERGY OPERATOR

(71) Applicant: OmniSpeech LLC, College Park, MD (US)

(72) Inventor: Vahid Khanagha, College Park, MD (US)

(73) Assignee: OmniSpeech LLC, College Park, MD (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/476,074

(22) Filed: Mar. 31, 2017

(65) Prior Publication Data

US 2017/0287510 A1 Oct. 5, 2017

Related U.S. Application Data

(60) Provisional application No. 62/316,432, filed on Mar. 31, 2016.

(51) Int. Cl.
*G10L 25/90* (2013.01)
*G10L 25/18* (2013.01)
*G10L 25/06* (2013.01)

(52) U.S. Cl.
CPC ............ *G10L 25/90* (2013.01); *G10L 25/06* (2013.01); *G10L 25/18* (2013.01)

(58) Field of Classification Search
None
See application file for complete search history.

(56) References Cited

U.S. PATENT DOCUMENTS

| | | | |
|---|---|---|---|
| 4,924,508 A * | 5/1990 | Crepy | G10L 19/08 704/207 |
| 6,004,017 A | 12/1999 | Madhavan | |
| 7,493,254 B2 | 2/2009 | Jung et al. | |
| 8,793,128 B2 | 7/2014 | Miki | |
| 8,954,324 B2 * | 2/2015 | Wang | G10L 25/78 704/215 |
| 9,153,245 B2 | 10/2015 | Qi et al. | |
| 2011/0099007 A1 | 4/2011 | Zhang | |
| 2013/0335267 A1 | 12/2013 | Heo et al. | |
| 2016/0259849 A1 | 9/2016 | Sinha et al. | |

OTHER PUBLICATIONS

Patti et al.; Method for classification of nocturnal migratory bird vocalizations using Pseudo Wigner-Ville Transform; 2013 IEEE International Conference on Acoustics, Speech and Signal Processing; pp. 758-762. (Year: 2013).*

(Continued)

*Primary Examiner* — Abul K Azad
(74) *Attorney, Agent, or Firm* — Maier & Maier, PLLC

(57) ABSTRACT

A pitch detection method. Such a pitch detection method may have M-PWVT-TEO algorithm to detect a pitch value from a speech signal, apply a partial auto-correlation to a current signal with the pitch value to compensate the delay of the pitch value. Also, the pitch detection method may apply a full auto-correlation to the speech signal where the pitch value is not detected to recover on-sets of the speech signal.

16 Claims, 3 Drawing Sheets

(56) References Cited

OTHER PUBLICATIONS

Chen et al.; Pitch detection algorithm based on Teager Energy Operator and spatial Correlation function; 2007 International Conference on Machine and Cybernetics; Year 2007; vol. 5, pp. 2456-2460. (Year: 2007).*

Boashash et al.; The Wigner-Ville trispectrum: definition and application; [1993 Proceedings] IEEE Signal Processing Workshop on Higher-order Statistics; pp. 260-264. (Year: 1993).*

Rainer Martin, "Spectral Subtraction Based on Minimum Statistics", Institute for Communication Systems and Data Processing (IND), Aachen University of Technology, Published: Nov. 3, 2009, 4 pgs.

* cited by examiner

PITCH DETECTION ALGORITHM BASED ON MULTIBAND PWVT OF TEAGER ENERGY OPERATOR

CROSS REFERENCE TO RELATED APPLICATIONS

This application claims priority from U.S. Provisional Patent Application Ser. No. 62/316,432, filed Mar. 31, 2016, the entire contents of which are hereby incorporated by reference.

BACKGROUND

There are two general categories of pitch detection algorithms. Time domain algorithms rely on the periodic shape of speech waveforms over time and use different measures of periodicity such as the autocorrelation function or Average Magnitude Difference Function (AMDF) to evaluate the periodicity of the waveform. These methods are often computationally expensive and are also prone to insertion errors when dealing with correlated types of noise, as they cannot discriminate between tonal periodicity of a correlated noise and the rich harmonically structured periodicity of speech.

Frequency domain methods however, are based on direct evaluation of the existence of speech harmonic frequency structure, using one of the many available spectral representation techniques, such as short term Fourier transform, wavelet transform, Cepstrum and others. The success of the frequency domain methods depend on their ability to resolve frequency components of the speech, especially in the presence of noise. The latter usually requires a relatively large analysis window (as large as 100 msec), which is not suitable for real-time applications that require the lowest possible processing delay. Moreover, a large analysis window compromises the time resolution of the pitch estimates.

There are many existing prior arts for pitch detection. They are based on many different criteria, in time-domain or frequency domain, for estimating the pitch. They differ, however, on their ability to be implemented in real-time with low latency and computational cost.

SUMMARY

According to at least one exemplary embodiment, a pitch detection method may be described. Such a method may enable delay compensation for delayed estimates of pitch values, from a frequency domain pitch detection algorithm that has a large latency, by using the partial auto-correlation function. Also, the method may enable on-set detection using full auto-correlation function.

Such a pitch detection method may include: applying an M-PWVT-TEO algorithm to a large 60 msec frame of the signal to obtain a pitch estimate with 30 msec of latency; compute the pitch estimate for a current 20 msec frame of the signal by taking the delayed pitch estimate as an initial guess; and computing a partial autocorrelation function of the current signal only around the initial guess, to generate a current pitch estimate as the value that maximizes the autocorrelation function. The pitch detection method may further include: applying a full auto-correlation to the frames of the signal in which no pitch value is detected by the M-PWVT-TEO and if the maximum correlation value is larger than an adaptive threshold, the location of maximum correlation is used to compute the current pitch estimate. Also, in the pitch detection method, when applying the partial auto-correlation, the partial auto-correlation is computed for a set of delay values that is maximum 10 percent variation of the initial guess. Additionally, in the pitch detection method, when deciding the corresponding delay value as the current pitch value, the adaptive threshold is an average of correlation values of the signal frames in which no pitch is detected.

In another exemplary embodiment, the M-PWVT-TEO algorithm may include: sampling the signal to generate a first discrete time signal; applying a Teager Energy Operator (TEO) to the first discrete time signal to generate a second discrete time signal; high-pass filtering the first discrete time signal to generate a high-pass filtered discrete time signal; applying a TEO to the high-pass filtered discrete time signal to generate a third discrete time signal; generating a first complex valued signal from the first discrete time signal; generating a second complex valued signal from the second discrete time signal; generating a third complex valued signal from the third discrete time signal; computing a Pseudo Weigner Ville Transformation (PWVT) on the first complex valued signal to generate a first spectral representation of the signal; computing a PWVT on the second complex valued signal to generate a second spectral representation of the signal; computing a PWVT on the third complex valued signal to generate a high-pass filtered spectral representation of the signal; generating a combined spectral representation from the first spectral representation and the second spectral representation; computing, to generate a pitch candidate, a harmonic summation on at least one of the combined spectral representation, the first spectral representation and high-pass filtered spectral representation; and deciding the pitch candidate as the pitch value if the pitch candidate is larger than a threshold. Also, the M-PWVT-TEO algorithm may further include: applying a Hilbert Transform to the first discrete time signal to generate the first complex valued signal; applying a Hilbert Transform to the second discrete time signal to generate the second complex valued signal; and applying a Hilbert Transform to the third discrete time signal to generate the third complex valued signal, wherein each of the first complex valued signal, the second complex valued signal and the third complex valued signal is low-pass filtered, buffered to generate an analysis window and down-sampled.

In another exemplary embodiment, the PWVT is computed by Discrete Fourier Transform to represent a frequency content of the signal over time. Also, when generating the combined spectral representation, the low-frequency part of the combined spectral representation are taken from the second spectral representation and a remaining part of the combined spectral representation is taken from the first spectral representation. Also, in the pitch detection method, when computing the harmonic summation, the harmonic summation is computed on the combined spectral representation if an amount of the low-frequency energy of the signal is larger than a pre-determined threshold that represent the low-frequency corruption of the signal, and the harmonic summation is computed within a human pitch frequency range.

In another exemplary embodiment, when deciding the pitch candidate as the pitch value in the pitch detection method, the pitch candidate can be the location of a maximum peak of the harmonic summation, and the threshold can be fifty times of a median value of at least one of the combined spectral representation, the first spectral representation and the high-pass filtered spectral representation. Also, when deciding the pitch candidate as the pitch value, the threshold is the minimum of the median value and the average value of harmonic summation values taken over more than one hundred frames of the signal in which no pitch is detected.

In another exemplary embodiment, when computing the harmonic summation, the harmonic summation is computed on the high-pass filtered spectral representation if an amount of a low frequency noise energy of the signal is larger than 5 times of a remaining frequency noise energy of the signal, and to obtain the low frequency noise energy and the remaining frequency noise energy, the Rainer Martin (RM) algorithm is applied.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

One of the challenges in detection of human pitch from noisy speech recordings is to cope with correlated types of noises, such as car engine noise, that contains strong and stable low-frequency activity. In such a case, the noise waveform has a periodic shape and thus, it is difficult to distinguish them from periodic voiced segments of the speech signal. Another technical problem appears for the speech recordings that have lost their low-frequency information due to various reasons such as imperfect recording conditions, telephony microphone filtering (a high-pass filtering effect with cut-off frequency around few hundreds of Hz).

To overcome this challenge, it is noted that the majority of voiced speech segments exhibit an impulsive type of periodicity (waveform looks like an exponentially weighted sinusoid) rather than a tonal type of periodicity (waveform looks like a sinusoid). This impulsive type of periodicity results in vertical striations in a wide-band spectrogram. The correlated types of noises, however, show a tonal type of periodicity and they sometimes are very similar to a pure sinusoid. Accordingly, this difference in the type of periodicity can be used to distinguish a correlated noise and voiced speech. The same concept can help to recover the weakened low-frequency content of high-passed filtered speech. Indeed, for high-pass filtered voiced speech, the periodic impulse train still exists, but it has little or no energy at frequencies below a few hundred Hz. However, as the impulses still show stable frequency activity around all the remaining frequency bands, once detected, they can be used to recover the weakened low-frequency information.

Figure 1:
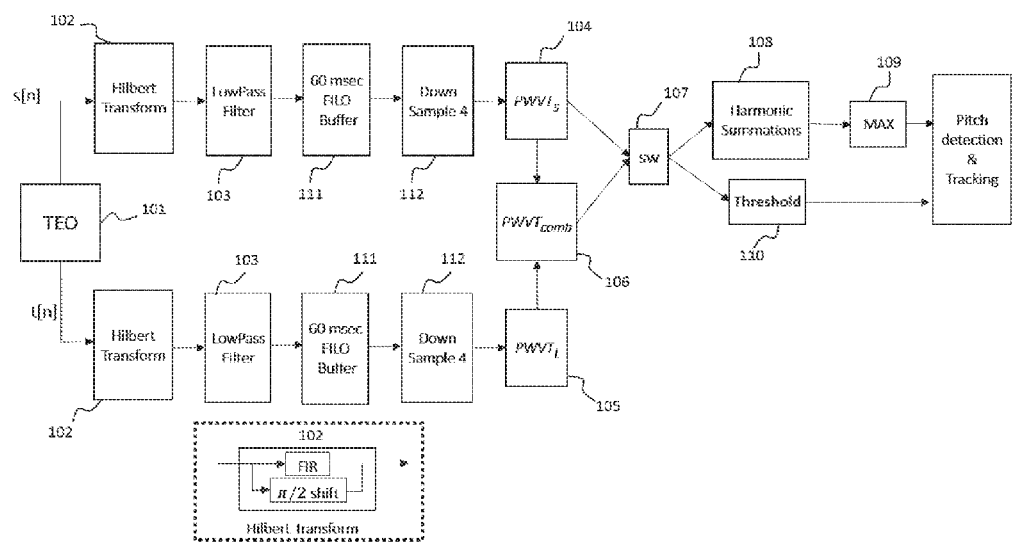
FIG. 1 is an exemplary block diagram of a pitch detection algorithm according to an exemplary embodiment.

Turning now to exemplary FIG. 1, FIG. 1 shows an exemplary block diagram of a pitch detection algorithm. According to an exemplary embodiment, to benefit from the above-mentioned spectral properties, the Teager Energy Operator (TEO) 101 is applied. TEO 101 acts as a non-linear filter: if applied to a tonal periodic waveform such as correlated noise, it returns a constant value and when applied to a high-pass filtered impulsive waveform, it recovers the low-frequency content. The TEO 101 applied to the discrete-time signal (s[n]) is defined as:

$$t[n]=s^2[n]-s[n-1]s[n+1] \quad \text{Equation 1}$$

Once the TEO is applied to the speech signal, the low-frequency spectral shape will be enhanced, as explained above. But the higher frequencies sometimes show distorted behavior. To solve this problem, a combinatory approach may be employed in an exemplary embodiment as follows.

Referring still to FIG. 1, the discrete time speech signal (s[n]) may be sampled at 8 kHz and fed to the pitch detection algorithm as 10 msec frames (80 samples at 8 KHz) and the TEO 101 is computed to obtain t[n]. As a Pseudo Weigner Ville Transformation (PWVT) operates on complex input signals, for both t[n] and s[n], at first, a Hilbert Transform 102 is applied to the signal. The Hilbert transform 102 is implemented in the time-domain using a half band Finite-Impulse-Response (FIR) filter. The output of the FIR filter forms the real part and the shifted version of speech signal (equal to π/2) forms the imaginary part. Consequently, the resulting complex values are low-pass filtered by an anti-aliasing low-pass filter 103 with a cut-off frequency of 1 kHz, and then buffered to form an analysis window of 60 msec length (e.g. reference number 111 of FIG. 1). Consequently, after down-sampling the analysis window by a factor of 4 (e.g. reference number 112 of FIG. 1), the PWVT 104 is computed.

According to an exemplary embodiment, the PWVT may be computed by taking the Discrete Fast Fourier Transform (DFFT) of the following discrete time correlation summation:

$$w_s[m] = \sum_{k=-256}^{256} g[k]s[k+m]s^*[k-m], \quad \text{Equation 2}$$

$$m = -255:254$$

$$w_t[m] = \sum_{k=-256}^{256} g[k]t[k+m]t^*[k-m], \quad \text{Equation 3}$$

$$m = -255:254$$

where g is a Gaussian smoothing window, m denotes time index and k denotes frequency index. $w_s[m]$ and $w_t[m]$ are then multiplied by another Gaussian window before computation of the 512 point DFFT to obtain the PWVT transform for both branches: $PWVT_s$ 104 is obtained from the signal itself and $PWVT_t$ 105 is obtained from the TEO 101. Both $PWVT_s$ 104 and $PWVT_t$ 105 provide a 512 point representation of the first 1 Khz frequency content of the signal over time. As $PWVT_t$ 105 provides an enhanced representation for lower frequencies and $PWVT_s$ 104 provides a clearer representation for the higher frequencies (above 250 Hz), according to an exemplary embodiment, the first 125 points are taken from $PWVT_t$ 105 and the remaining is taken from $PWVT_s$ 104 to form a combined representation $PWVT_{comb}$ 106.

Although $PWVT_{comb}$ 106 provides an overall enhanced representation for noisy speech, using only the representation computed from the raw speech signal ($PWVT_s$ 104) may still be utilized when the signal is clean, or when there is no low-frequency corruption. This provides computational efficiency (when $PWVT_t$ is not computed at all) as well as precision for the rare cases where the TEO 101 filters out some of the voiced frames. For this reason, in an exemplary embodiment, a state machine (shown as SW 107 in FIG. 1) may be implemented to decide which PWVT is to be used between $PWVT_{comb}$ 106 or $PWVT_s$ 104. According to an exemplary embodiment, the algorithm starts in the state that it uses $PWVT_{comb}$ 106. Then for every ten frames, the relative amount of the low-frequency energy may be computed as:

$$R_e = \frac{\sum_{k=30}^{110} PWVT_s}{\sum_{k=30}^{110} PWVT_{comb}} \quad \text{Equation 4}$$

According to an exemplary embodiment, if it happens for more than ten times that $R_e \cong 1$, the state is switched to the mode that the $PWVT_s$ 104 is only used. Afterwards, if it happens for more than ten frames that $R_e < 0.2$, the state is switched back to the mode that $PWVT_{comb}$ 106 is used.

Once it is decided which PWVT is to be used, by using the absolute value of this representation, the existence of harmonics can be checked, as they appear during the voiced parts of the speech signal. For doing so, the Harmonic summations 108 of the PWVT[m,k] may be computed as:

$$HS[m, k] = \sum_{q=1}^{N_q} PWVT[m, qk] - \sum_{q=1}^{N_q} PWVT[m, (q + 0.5)k] \quad \text{Equation 5}$$

According to an exemplary embodiment, HS[m,k] is being computed only in the frequency range that corresponds to the range of human pitch frequency (60 Hz to 400 Hz). If a given analysis window contains voiced speech with a pitch frequency corresponding to frequency bin $k_0$, PWVT [m,k] will show prominent peaks at integer multiples of $k_0$ with valleys located between adjacent peaks. Consequently, HS[m,k] is expected to generate prominent maxima at the bin $k_0$. Thus, the location of the maximum of HS[m,k] ($k_{max}$) may be taken as a candidate pitch (e.g. the reference number 109 of FIG. 1). If a processed frame belongs to a voiced segment of the speech signal, $HS[m,k_{max}]$ should attain a very high value. Accordingly, in an exemplary embodiment, a threshold must be applied to decide whether the computed value is high enough to consider the current frame is a voiced one. According to an exemplary embodiment, to reduce the sensitivity of the algorithm to input signal power variations, a soft threshold may be used to make the final decision (instead of a fixed hard threshold that is vulnerable to input level variations). To do so, the median value of PWVT[m,k] is taken as the noise floor level ($N_f$) (e.g. the reference number 110 of FIG. 1) and then if $HS[m,k_{max}]$ is larger than about 50 times the noise floor, the frame being processed is considered a voiced frame and $K_{max}$ is taken the frequency index of the corresponding pitch frequency. Such decision logic may detect higher pitch frequencies for which the harmonic distance is relatively high and thus median value of the $PWVT[m,k_{max}]$ provides a good estimate of the noise floor.

However, for the voiced speech with lower pitch value, the harmonic lines can be so close that they overlap and the median value is too large to be considered as a threshold. According to another exemplary embodiment, to avoid this issue, a second criterion (second threshold) may be used in making the voicing decision based on a second threshold, which is the moving average of $PWVT[m,k_{max}]$ over the non-speech frames. According to another exemplary embodiment, this second decision criteria is based on a feedback from the first criteria and updates the moving average value, only at the frames that are not considered as voiced frames. More specifically, at the initialization time, only the first criteria is applied and for the frames that are not taken as voiced, the moving average is being updated ($MA_{PWVT_{noise}}$). According to another exemplary embodiment, after one hundred updates, the second criterion may be started to be considered as a threshold and the frame may be taken as voiced if either of the two criteria are met, (for example, $PWVT[m,k_{max}] > 50 N_f$ or $PWVT[m,k_{max}] > 2 MA_{PWVT_{noise}}$). As the analysis window is 60 msec long, the computed pitch value belongs to the center of the frame and as such, the algorithm has 30 msec of inherent latency (delay in computation of the pitch value for each new frame).

As described above, the PWVT-TEO algorithm of FIG. 1 relies on the information contained in the frequency range below 1 kHz. The PWVT-TEO algorithm performs well for most of the noise cases, but it has a shortcoming for the special case of noises that corrupt the frequency range that the algorithm relies on, even if the speech information is preserved neatly in the higher frequency ranges. Accordingly, to solve the problem, in another exemplary embodiment, approaching a third level of combination with using the TEO applied to the High Passed Filter (HPF) version of the signal may be applied to recover the information about the speech signal that is preserved in higher frequencies.

Figure 2:
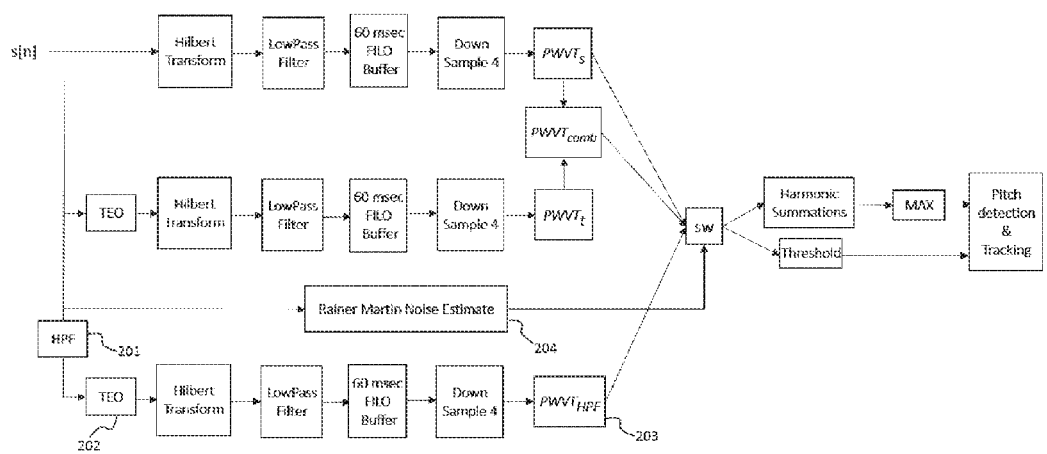
FIG. 2 is an exemplary block diagram of a pitch detection algorithm where high-pass filtered signal is applied to TEO according to another exemplary embodiment.

Turning now to exemplary FIG. 2, FIG. 2 shows a block diagram of a pitch detection algorithm where high-pass filtered signal is applied to TEO to recover speech from a strong noise in the frequency range below 1000 Hz. As shown in FIG. 2, the first two branches of the algorithm are exactly same as the PWVT-TEO algorithm in FIG. 1. The PWVT-TEO algorithm of FIG. 1 may handle the case where the signal is completely corrupted by noise in the frequency range below 1000 Hz, but there is information left about the speech signal in the range above 1000 Hz. Indeed, the majority of voiced speech segments exhibit an impulsive type of periodicity and their waveform resembles a train of smoothened impulses. These impulses exhibit a flat frequency activity across all frequencies (sometimes up to 4000 Hz).

According to another exemplary embodiment, the concept of Teager Energy Operator (TEO) may also be applied to take advantage of the remaining information in the higher frequencies. As described above, TEO acts as a non-linear filter; if applied to a tonal periodic waveform such as correlated noise, it returns a constant value and when applied to a high-pass filtered 201 impulsive waveform, it recovers the low-frequency content. Also, in another exemplary embodiment, the TEO applied to the discrete-time signal (s[n]) is defined as the same as the Equation 1 of FIG. 1.

In an exemplary embodiment, to reduce the effect of noise, a High Pass Filter (HPF) with a cut-off frequency of 1000 Hz is applied to the signal (s[n]) before TEO 202 is applied to recover the low frequency impulsive behavior of voiced speech. Indeed, in places where there remains a strong impulse in the frequency range above 1 kHz, the TEO recovers the impulsive behavior in the first 1 kHz. Consequently, the PWVT-based algorithm can be used to detect the pitch value (the resulting PWVT may be called as $PWVT_{HPF}$ 203).

The above-mentioned procedure may significantly improve the performance of pitch detection for the above-mentioned types of noises. However, for other noise cases, the PWVT-TEO of FIG. 1 may show superior performance Thus, according to another exemplary embodiment, the PWVT-TEO of FIG. 1 is used except in the case that the first 1 kHz of the signal is completely corrupted. To do so, a decision mechanism is applied to switch between two versions of PWVT: $PWVT_{HPF}$ 203 and $PWVT_{comb}$. This may be done through the use of the Rainer Martin (RM) algorithm 204 that provides an estimate of the minimum noise floor at different frequencies. According to an exemplary embodiment, a 256-point DTFFT may be computed and the RM is applied to provide minimum noise estimates of the past 1 sec of the speech. If the noise energy in the first 1 kHz was significantly (for example 5 times) higher than the noise energy in the remaining 3 kHz, the state is switched to use the $PWVT_{HPF}$. Otherwise, the normal operation of the PWVT-TEO will be continued, as described above with FIG. 1. The algorithm of FIG. 2 may be named as Multi-band low-latency PWVT-based pitch detection algorithm (M-PWVT-TEO algorithm).

The M-PWVT TEO algorithm of FIG. 2 may be able to provide a robust pitch estimation in many different noise cases. The M-PWVT TEO algorithm, in all its different modes, may rely on a 60 msec analysis window and each estimate it generates, belongs to the center of the window. Consequently, each pitch estimate would be 30 msec delayed. This can be problematic because the delay may not be acceptable in many real-world applications as the latency is required to be smaller than 10 msec. This 60 msec analysis window is actually the minimum required to have a high-resolution accurate time-frequency representation using a Pseudo Weigner Ville Transformation (PWVT). Thus window-size cannot be further reduced. Instead, according to another exemplary embodiment, in order to reduce the latency, a two-stage pitch detection algorithm is provided: at the first stage, the M-PWVT TEO algorithm is applied to benefit from the accuracy and robustness of that algorithm; and then, in the second stage, the estimated pitch value is used, that belongs to a point 30 msec in the past, as an initial guess to find the value for the current frame. As such, a pitch estimate with only 10 msec latency can be attained.

Figure 3:
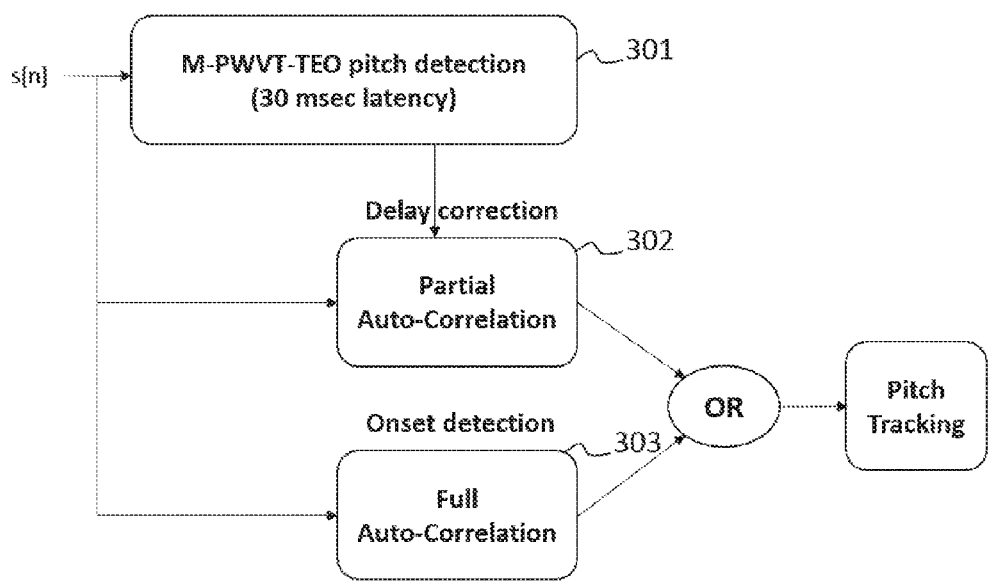
FIG. 3 is an exemplary block diagram of a pitch detection where delay compensation and on-set detection is added to the M-PWVT-TEO algorithm of FIG. 2. according to another exemplary embodiment.

Turning now to exemplary FIG. 3, FIG. 3 shows a block diagram where delay compensation and on-set detection is added to the M-PWVT-TEO algorithm of FIG. 2. As explained above, the M-PWVT-TEO algorithm of FIG. 2 may provide a pitch estimate with 30 msec of latency. It means that, for example, for any input speech frame, the estimate belongs to two frames in the past. As human's pitch frequency does not vary a lot in such a short span of time (20 msec), the pitch frequency for the current frame is expected to be very close to the estimate obtained for two frames in the past (20 msec ago). Thus, the last estimate is taken as an initial guess and in the "Delay correction" module 302, this value is taken to run a partial version of the time-domain auto-correlation method to attain the current pitch value. The original auto-correlation method computes the correlation value between the signal and its delayed version, for all the possible delay values and takes the delay value that shows the highest amount of correlation, as the pitch period estimate. As there are about 300 different delay values to be examined, this can be a computationally expensive procedure. According to an exemplary embodiment, the correlation value is thus only computed for a small set of delay values around the initial guess provided by the M-PWVT-TEO algorithm 301 (only for few lags that account for at most 10% variation of the initial guess). Therefore, this module 302 may be named as "partial" auto-correlation. As such, the initial pitch estimates can be successfully modified with fairly low computational cost. However, for the first two frames of each vowel (onsets), there is no initial estimate available from the M-PWVT-TEO 301 since it is 20 msec late. To overcome this technical problem, in an exemplary embodiment, a third mechanism for onset detection 303 may be provided as a technical solution to the problem. According to an exemplary embodiment, the onset detection mechanism 303 may use the full auto-correlation method for the frames in which M-PWVT-TEO 301 has not detected any pitch value. This full version of auto-correlation function may not be a significant computational burden, as it may be only computed for a fraction of frames for which, M-PWVT-TEO has not detected a pitch value. According to an exemplary embodiment, the autocorrelation function and the maximum correlation value ($R_{max}$) may be computed. If $R_{max}$ was larger than a threshold $R_{th}$, the corresponding delay value may be taken as an estimate for the pitch period. As the sensitivity of the algorithm to the signal level needs to be avoided, an adaptive threshold may be used instead of a fixed $R_{th}$. This adaptive threshold is in fact a running average of correlation value during non-speech frames of the speech signal as it is computed during the frames that the M-PWVT-TEO algorithm has not detected a pitched frame:

$$R_{th}=0.95 \times R_{th}+0.05 \times R_{max} \qquad \text{Equation 6}$$

Overall, in an exemplary embodiment, the M-PWVT-TEO and the delay compensation module may provide the pitch estimates for all of the voiced sounds except for their onsets. The onsets can be, however, recovered using the full auto-correlation function.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of a pitch detection comprising:
   applying a Multi-band low-latency Pseudo Weigner Ville Transformation pitch detection algorithm using a Teager Energy Operator (M-PWVT-TEO algorithm) to a signal to detect a pitch value;
   taking the pitch value as an initial guess; and
   applying a partial auto-correlation to a current signal with the initial guess to generate a current pitch value;
   applying a full auto-correlation to the signal in which the pitch value is not detected to generate a maximum correlation value; and
   deciding a corresponding delay value of the maximum correlation value as the current pitch value if the maximum correlation value is larger than an adaptive threshold.

2. The method of claim 1, wherein the partial auto-correlation is computed for a set of delay values that that represents a maximum 10 percent variation of the initial guess.

3. The method of claim 1, wherein when deciding the corresponding delay value as the current pitch value, the signal comprises frames of a speech signal, the M-PWVT-TEO algorithm is applied to each frame of the speech signal, the adaptive threshold is an average of correlation values of the frames in which the pitch value is not detected, and the average is updated in each frame.

4. The method of claim 1, wherein the M-PWVT-TEO algorithm comprises:
   sampling the signal to generate a first discrete time signal;
   applying a Teager Energy Operator (TEO) to the first discrete time signal to generate a second discrete time signal;
   high-pass filtering the first discrete time signal to generate a high-pass filtered discrete time signal;
   applying a TEO to the high-pass filtered discrete time signal to generate a third discrete time signal;
   generating a first complex valued signal from the first discrete time signal;
   generating a second complex valued signal from the second discrete time signal;
   generating a third complex valued signal from the third discrete time signal;
   computing a Pseudo Weigner Ville Transformation (PWVT) on the first complex valued signal to generate a first spectral representation of the signal;
   computing a PWVT on the second complex valued signal to generate a second spectral representation of the signal;
   computing a PWVT on the third complex valued signal to generate a high-pass filtered spectral representation of the signal;
   generating a combined spectral representation from the first spectral representation and the second spectral representation;
   computing, to generate a pitch candidate, a harmonic summation on at least one of the combined spectral representation, the first spectral representation and high-pass filtered spectral representation; and
   deciding the pitch candidate as the pitch value if the pitch candidate is larger than a threshold.

5. The method of claim 4, further comprising:
   applying a Hilbert Transform to the first discrete time signal to generate the first complex valued signal;
   applying a Hilbert Transform to the second discrete time signal to generate the second complex valued signal; and
   applying a Hilbert Transform to the third discrete time signal to generate the third complex valued signal,
   wherein each of the first complex valued signal, the second complex valued signal and the third complex valued signal is low-pass filtered, buffered and down-sampled.

6. The method of claim 4, wherein the PWVT is computed by Fourier Transform to represent a frequency content of the signal over time.

7. The method of claim 4, wherein a low-frequency part of the combined spectral representation are taken from the second spectral representation and a remaining part of the combined spectral representation are taken from the first spectral representation.

8. The method of claim 4, wherein the harmonic summation is computed on the combined spectral representation if a relative amount of a low-frequency energy of the signal is larger than a pre-determined threshold.

9. The method of claim 4, wherein the harmonic summation is computed within a human pitch frequency range.

10. The method of claim 4, wherein when deciding the pitch candidate as the pitch value, the pitch candidate is a frequency location of a maximum value of the harmonic summation.

11. The method of claim 4, wherein when deciding the pitch candidate as the pitch value, the threshold is fifty times of a median value of at least one of the combined spectral representation, the first spectral representation and the high-pass filtered spectral representation.

12. The method of claim 4, wherein when sampling the signal, the signal is sampled in each frame of the speech signal.

13. The method of claim 12, wherein when deciding the pitch candidate as the pitch value, the threshold is a smaller value between the median value and an average value of harmonic summation values taken over more than one hundred frames of the signal in which the pitch value is not detected.

14. The method of claim 4, wherein the harmonic summation is computed on the high-pass filtered spectral representation if a low frequency noise energy of the signal is larger than a remaining high frequency noise energy of the signal.

15. The method of claim 4, wherein the harmonic summation is computed on the high-pass filtered spectral representation if a first frequency noise energy of the signal is larger than 5 times of a second frequency noise energy of the signal, and the first frequency noise energy is a noise energy of a first 1 kHz and the second frequency noise energy is the noise energy of a remaining 3 kHz.

16. The method of claim 4, wherein when computing the harmonic summation, the Rainer Martin (RM) algorithm is applied to provide minimum noise estimates of a past 1 sec of the signal.

* * * * *